(12) United States Patent
Khalid et al.

(10) Patent No.: US 9,818,081 B2
(45) Date of Patent: Nov. 14, 2017

(54) SMART HOOK FOR RETAIL INVENTORY TRACKING

(71) Applicant: Verizon Patent and Licensing Inc., Arlington, VA (US)

(72) Inventors: Mohammad Raheel Khalid, Budd Lake, NJ (US); Ji Hoon Kim, Lyndhurst, NJ (US); Manuel Enrique Caceres, Basking Ridge, NJ (US); Yuk Lun Li, Morganville, NJ (US); SM Masudur Rahman, Edison, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 220 days.

(21) Appl. No.: 14/590,127

(22) Filed: Jan. 6, 2015

(65) Prior Publication Data

US 2016/0196526 A1    Jul. 7, 2016

(51) Int. Cl.
| | |
|---|---|
| G06Q 10/06 | (2012.01) |
| G06Q 10/08 | (2012.01) |
| H04W 4/00 | (2009.01) |
| A47F 5/08 | (2006.01) |
| G06Q 20/20 | (2012.01) |
| A47F 10/02 | (2006.01) |

(52) U.S. Cl.
CPC ......... *G06Q 10/087* (2013.01); *A47F 5/0869* (2013.01); *H04W 4/008* (2013.01); *A47F 2010/025* (2013.01)

(58) Field of Classification Search
USPC ............. 235/385; 248/550; 704/269; 705/28
See application file for complete search history.

(56) References Cited

U.S. PATENT DOCUMENTS

| | | | | |
|---|---|---|---|---|
| 3,746,791 A | * | 7/1973 | Wolf ...................... | G10L 19/08 704/269 |
| 2014/0299663 A1 | * | 10/2014 | Shah ...................... | G06K 7/065 235/385 |
| 2015/0041616 A1 | * | 2/2015 | Gentile ................ | G06Q 10/087 248/550 |

* cited by examiner

*Primary Examiner* — Scott Zare
*Assistant Examiner* — Reva R Danzig

(57) ABSTRACT

A smart hook system for a store display including a hook configured to hang smart items having a resistor and a capacitor for display in a store. The hook at least one resistive electrical contact configured to come into electrical circuit contact with the resistor of the smart items hanging on the hook, and at least one capacitive electrical contact configured to come into electrical contact with the capacitor of the smart items that are hanging on hook. The smart hook also includes a processor configured to measure the resistance and capacitance of the smart items that are hanging on hook, and determine a quantity of the smart items hanging on the hook and identity of the smart items hanging on the hook based on the measured resistance and capacitance.

20 Claims, 19 Drawing Sheets

SMART HOOK FOR RETAIL INVENTORY TRACKING

BACKGROUND

Employees at brick and mortar retail stores are tasked with jobs of stocking inventory on shelves/hooks and keeping track of product quantities on a day-to-day basis. These tasks include correcting misplaced stock items and updating ordering systems to maintain desired stock quantities in the store and on the shelves/hooks.

Maintaining stock in a retail store is a necessary and vital process for any brick and mortar retail business. Current industry solutions rely on an in-store employee actively placing, logging and organizing the inventory. Even if some aspects use automated equipment, such as bar code scanners to take inventory, these processes are still time consuming, monotonous and prone to human error. This human based solution often leads to inefficient inventory methods, erroneous ordering of inventory items and erroneous stocking of items in the storefront.

As a result, most brick and mortar retailers have significant challenges in accurately maintaining stock utilizing these human methods.

BRIEF DESCRIPTION OF THE DRAWINGS

The figures depict one or more implementations in accordance with the present teachings by way of example only, not by way of limitation. In the figures, like reference numbers refer to the same or similar elements.

DETAILED DESCRIPTION OF EXAMPLES

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high level, without detailed comment in order to avoid unnecessarily obscuring aspects of the present teachings.

The ability exists to provide a retail store with a more efficient and accurate means of tracking inventory (e.g. for-sale products hanging on hooks in a store display). More specifically, there is a need to automatically track inventory with minimal interaction by store employees. The solution is a system that seamlessly manages inventory data (both product type and quantity) using smart hook systems on racks or other in-store product displays that allow associated processing equipment to determine both the type and quantity of the products hanging on each smart hook in the retail displays. A number of smart hooks are connected to a processor, such as a microcontroller in or connected to a display rack. In the microcontroller example, the microcontroller sends information over a network to an inventory manager (e.g. backend server), which allows customer service representatives to automatically track inventory throughout the store, order new inventory, move incorrectly placed products, etc. The backend server also sends queries to the microcontroller to request stock information on a particular smart hook in the store. In response to the request, the microcontroller responds with the quantity and identity of the products on the smart hook. A number of examples of the smart hooks are shown and described below, e.g. incorporating different sensing technologies to determine type and quantity from products hanging on the smart hooks.

Figure 1A:
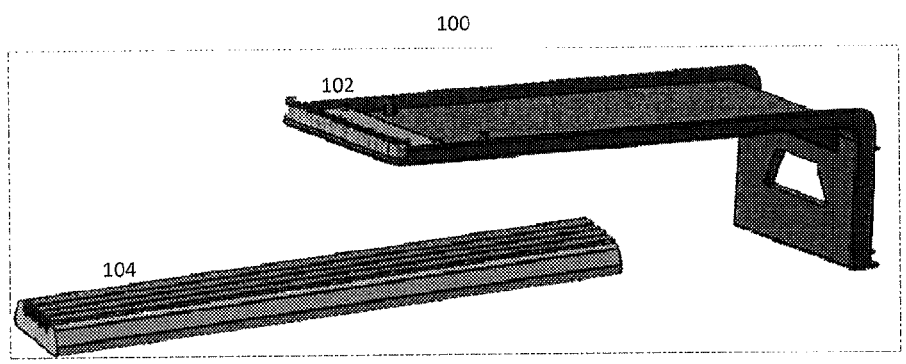
FIG. 1A shows a side view of an example of a smart hook having parallel electrical contacts.

Shown in FIG. 1A is one example of a smart hook 100 that includes a mounting and display bracket 102 as well as a hook 104 with electrical contacts. The mounting bracket 102 and the hook 104 are shown disassembled or disconnected from each other, for explanation purposes. This first example uses contacts and a combination of resistive and capacitive sensing.

In the example shown in FIG. 1A hook 104 includes four electrical contacts (e.g., electrical wires). These electrical contacts come into contact with other electrical contacts on smart hang tabs (described later) that are attached to the products that are hung on hook 104. Each of the products hung on hook 104 may include a smart hang tab with an integrated resistor and a capacitor that are measured by a microcontroller (not shown in FIG. 1A). The microcontroller in one embodiment is able to identify the products and determine the quantity of the products that are hanging on hook 104, by being able to read the resistance and/or capacitance of the smart hang tabs holding the products hung on hook 104. The various embodiments described throughout the specification refer to the resistance of the smart hang tab indicating quantity of the products on the hook and the capacitance of the smart hang tab indicating identity of the products on the hook. It is noted, however, that this may be the opposite (e.g. resistance of the smart hang tab indicating identity and capacitance of the smart hang tab indicating quantity).

Figure 3:
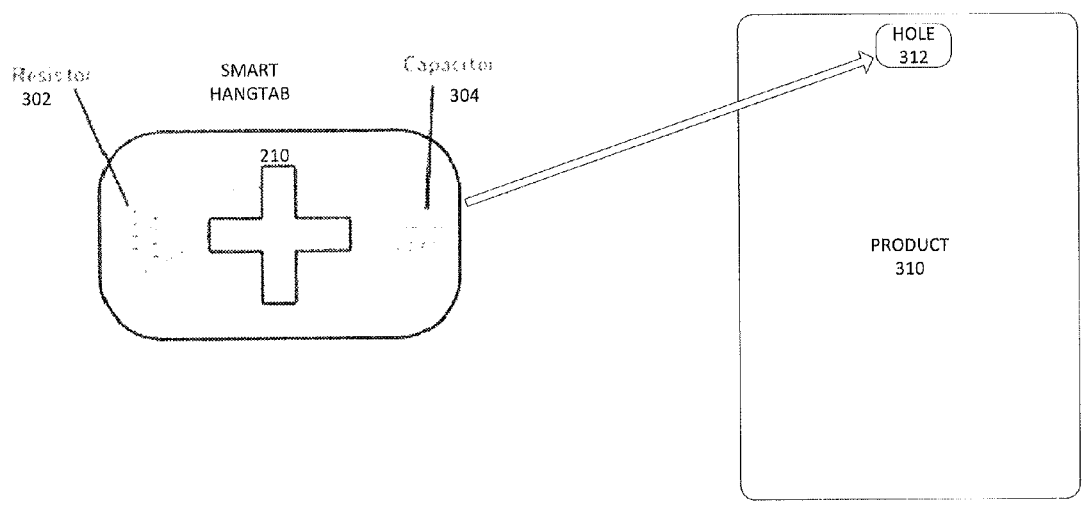
FIG. 3 shows the configuration of resistive and capacitive contacts on the smart hang tab configured to slide over the smart hook from FIG. 2.
Figure 5:
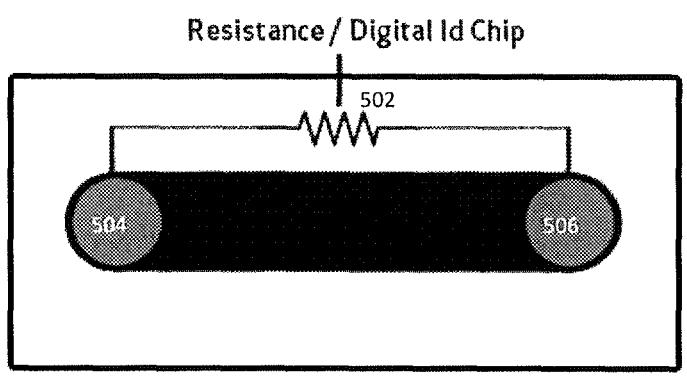
FIG. 5 shows a front view of an example of a smart hang tab having a built in resistance and configured to slide over the smart hook in FIG. 4.

For example, the products that hang on hook 104 may include a smart hang tab (see FIGS. 3 and 5) which includes a built-in resistor and/or capacitor value that is installed into the packaging location of a conventional tab used for hanging the product (see FIG. 3 where the smart hang tab is inserted into the hole 312 for hanging the product 310). This installation is performed either by a store employee (e.g. employee inserts the smart hang tab into the hole 312 of the conventional tab) or the manufacturer of the product (e.g. manufacturer manufactures the product packaging to include the smart hang tab). Alternatively, the smart hang tab may include an adhesive tag that sticks to the product (see FIG. 6A where tag 612 holds product 601 to the smart hang tab 602). In either case, the combination of the product with the smart hang tab produces a smart item that can be hung on the smart hook. When hung on the smart hook, the resistor of the smart hang tab may come into electrical contact with two of the electrical contacts of hook 104, while the capacitor of the smart hang tab may come into electrical contact with the other two electrical contacts on hook 104. The resistance and capacitance values of the smart hang tab are measured and sent to the microcontroller and analyzed to determine the identity and quantity of the smart items hanging on hook 104.

Although FIG. 1A shows four electrical contacts (e.g. four wires) on hook 104, it is contemplated that less than four contacts may be utilized. Specifically, three contacts may be utilized where one of the contacts is used in common for the measurements of both the resistance and capacitance of the smart hang tab (see FIG. 3), or only two contacts may be utilized where the resistor and/or capacitor of the smart hang tab are both commonly connected and deciphered by the processor.

Figure 1B:
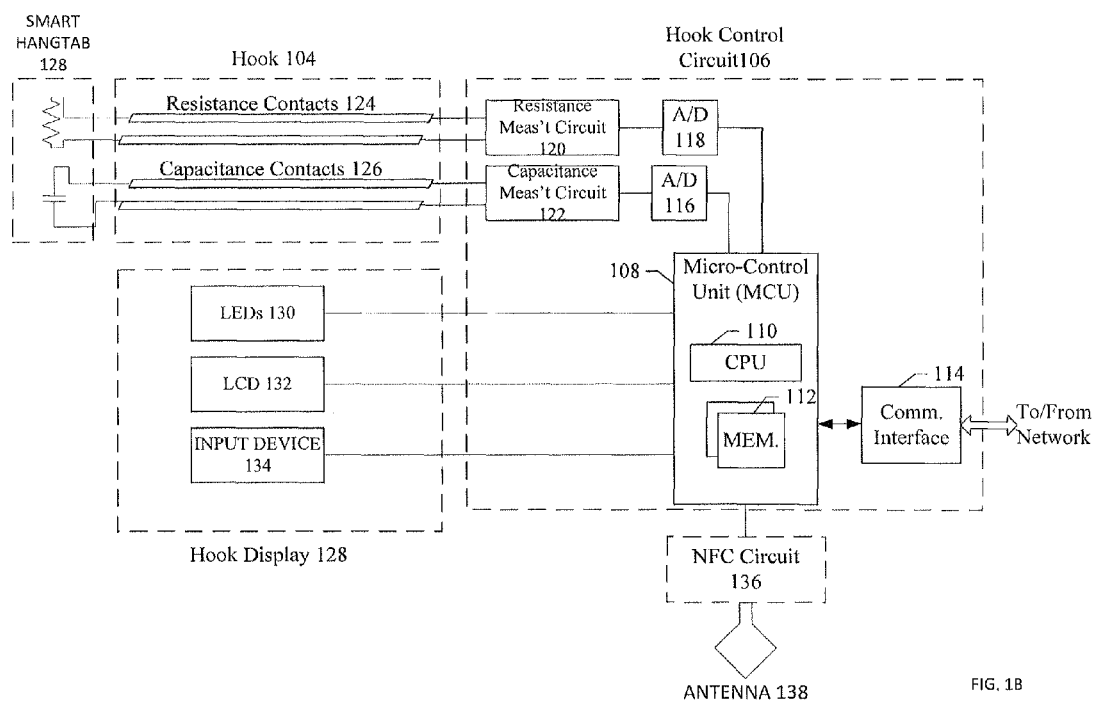
FIG. 1B shows a block circuit diagram of electrical elements of a smart hook.

FIG. 1B is a simple block circuit diagram of the electrical elements (e.g. contacts) of a hook like that shown in FIG. 1A together with an associated hook control circuit, forming a smart hook system for a store display. Although shown as connected to only one smart hook 100, a control circuit like that in FIG. 1B may connect to some larger number of smart hooks.

As shown in FIG. 1B, the hook 104 includes two resistive contacts 124 configured to contact resistors in smart hang tabs 128 when smart items with the smart hang tabs are hung on the hook for display. The hook 104 also includes two capacitive contacts 126 configured to contact resistors in smart tabs 128 when smart items with the smart tabs are hung on the hook for display. The drawing illustrates one tab with a resistor in contact with the resistive contacts to form a circuit and with one capacitor in contact with the capacitive contacts to form a circuit.

The hook control circuit 106 includes two measurement circuits. One such circuit is a resistive measurement circuit 120 connected across the resistive contacts 124 and therefore in contact with the resistor(s) in smart hang tab 128 currently contacting the resistive contacts 124. For example, this resistive measurement circuit 120 may act as an "ohmmeter" by applying a known voltage to the resistive contacts 124 and then measuring the electrical current flowing through the resistive contacts 124 due to the connection of the resistor of the smart hang tab(s). The resistive measurement circuit 120 may then send the measured current and possibly the applied voltage to the programmable central processing unit (CPU) 110 of the micro-control unit (MCU) 108 via the analog to digital (A/D) converter 118. CPU 110 may then use a look-up table stored in memory 112 to determine the resistance value of the smart hang tab resistor based on the digitized current signal. This look-up table may be populated with digital resistance values that are associated with digital current and/or voltage values due to Ohm's law. It should be noted that other conventional techniques for measuring resistance may also be utilized.

The hook control circuit also includes a capacitive measurement circuit 122 connected across the capacitive contacts 126, and therefore in contact with the capacitor(s) of smart hang tab 128 currently contacting the capacitive contacts 126. For example, this capacitive measurement circuit 122 may act as a "capacitance meter" by charging and/or discharging the capacitor of the smart hang tab(s) with a known electrical current through the capacitive contacts 126. The capacitive measurement circuit 122 may then measure the resultant voltage on capacitance contacts 126 and send this resultant voltage to the CPU 110 of the MCU 108 via the A/D converter 116. CPU 110 may then compute a rate of change in the voltage as the capacitor is being charged/discharged. CPU 110 may then use a look-up table stored in memory 112 to determine the capacitance value of the smart hang tab capacitor based on the computed rate of change of the voltage. This look-up table may be populated with digital capacitance values that are associated with different rates of change of voltage (e.g. rate of change in electrical voltage relates to the size of the capacitor). It should be noted that other conventional techniques for measuring capacitance may also be utilized.

Although, described with specific examples above, the resistive and capacitive measurement circuits can take any suitable form for sensing resistance and capacitance, for example, similar to circuits for sensing resistance and capacitance in meters or the like. The outputs of the measurement circuits connect to A/D converters 116 and 118 that produce digital data values (e.g. current and/or voltage values) representing the sensed values of hang tab resistor and capacitor, respectively.

A variety of strategies/technologies may be used to provide the sensing, processing logic and communications based on information obtained via the hook contacts and the associated measurement circuits. Although logic circuits or programmable gate arrays might be used, the trend in development of smart devices in general is to utilize programmable processors to implement the host control and communication logic. Although the processor 110 of the hook control circuit 106 might be implemented using a microprocessor similar to those in computers or mobile devices, the illustrated example of hook control circuit 106 uses a MCU 108 sometimes referred to as a microcontroller.

The MCU 108 implements the control logic for the hook control circuit, that is to say, controls operations of the hook control circuit based on execution of its embedded 'firmware' instructions. The MCU 108 may be a microchip device that incorporates a processor serving as the CPU 110 of the MCU 108 and thus of the hook control circuit 106 as well as one or more memories accessible to the CPU 110. The memory or memories store the executable programming for the CPU 110 as well as data for processing by or resulting from processing of CPU 110. The memory or memories, for example, may store and/or may temporarily store resistance and capacitance measurement data that the hook control circuit 106 intends to send to a higher level data processing system. MCU or "microcontroller" 108 may be thought of as a small computer or computer like device formed on a single chip. Such devices are often used as the configurable control elements embedded in special purpose devices rather than in a computer or other general purpose device.

The hook control circuit 106 also includes a communication interface 114 coupled to a communication port of the MCU 108. The interface 114 provides a communication link to a telecommunications network that enables the MCU 108 to send and receive digital data communications through the particular network, for example, to receive requests from the backend server and transmit stock information based on the measurements to the backend server.

The transmission of the stock information may be performed autonomously by the smart hook in a periodic manner, or may be triggered when items are placed on or taken from the smart hook (e.g. when the total equivalent resistance and/or capacitance of the smart hang tabs increases and/or decreases). Alternatively, the transmission of the stock information may be performed in response to the smart hook receiving a request from the backend server. The backend server may send these requests in a periodic manner or on the request from an authorized operator that communicates with the backend server through a personal computer or other device.

The network may be wired (e.g. metallic or optical fiber), wireless (e.g. radio frequency or free space optical) or a combination of such network technologies; and the interface 114 in a particular installation of the hook 104 and the hook control circuit 106 corresponds to the most advantageous network available (e.g. based on considerations such as cost and bandwidth) at the location of the installation. For example, if the network is a particular type of local area network (LAN), the communication interface 114 is of a type for linking to and communication through the available type of LAN. The communication interface 114 is therefore accessible by the processor/CPU 110 of the MCU 108, and the communication interface 114 is configured to enable the processor 110 to communicate information such as values of measured resistance and measured capacitance through the LAN or other communications network.

Also shown in FIG. 1B is a hook display 128. The hook display 128 may be mounted to bracket 102 in FIG. 1A and include various output devices for displaying information to a user, such as store employee or customer. Examples of the output devices include, but are not limited to, light emitting diodes (LED)s 130 and a liquid crystal display (LCD) 132 for outputting flashing lights and messages to the user. The MCU 108 in such an example provides signals to the output devices to cause the output devices to operate in a manner to present information to the user. Hook display 128 may also include one or more of various types of input devices 134 for receiving information from the user, which in turn provide input data to the MCU 110. Examples of the input device(s) 134 include, but are not limited to, a touchscreen and buttons to receive information and instructions from the user. These output and input devices of hook display 128 may allow a user to interact with the smart hook.

The first example of the smart hook used a combination of resistive and capacitive sensing to obtain number and identification of smart items on the smart hook. However, other sensing or data capture strategies/technologies may be used in addition to or in place of one or both of the resistive and capacitive sensing. Also shown in FIG. 1B, by way of an example, is a near field communication (NFC) circuit 136 and NFC antenna 138. This allows the processor 110 of MCU 108 to receive and transmit information to other devices using compatible NFC technology. As will be described with respect to FIG. 6D, a place holder tab may be placed on the hook 104 prior to any product or smart item being placed on the hook. The place holder tab is a tab somewhat similar to the smart hang tab (i.e. not attached to a product or smart item) that may have NFC capabilities to communicate information such as product identity to processor 110 of MCU 108. In one example, this may eliminate the need for a capacitance contacts on the hook and on the smart item (i.e. the place holder tab gives identity of the products). The drawing shows the NFC reader (antenna 138 and transceiver 136) as an optional addition to a system that includes both resistive and capacitive contacts on the hook 104. With the addition of NFC capability, at least one set of the contacts and associated measurement circuitry/functionality may be eliminated and replaced by the NFC functionality. It is noted that the NFC circuit/antenna may be implemented as other radio frequency (RF) based communications such as WiFi, Bluetooth, etc.

Figure 1C:
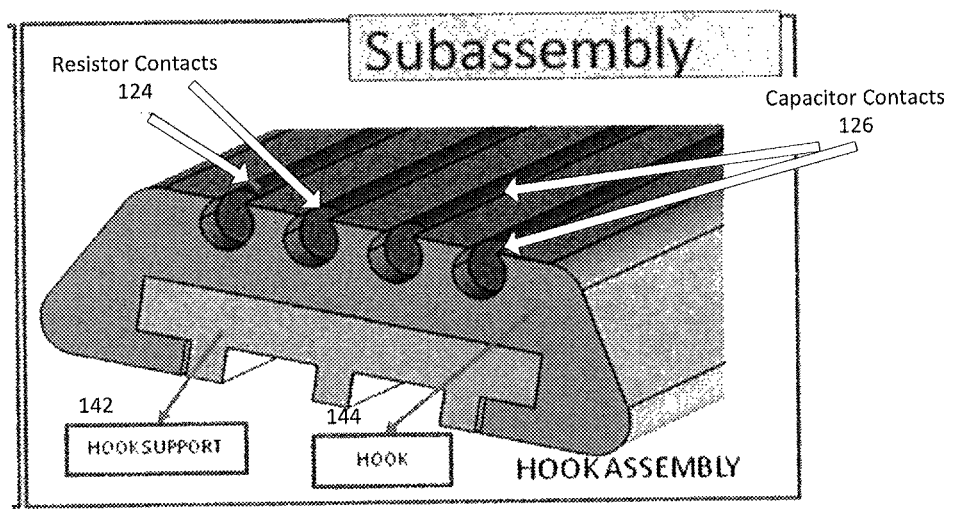
FIG. 1C shows a front view of the hook in FIG. 1A.

Hook 104 shown in FIGS. 1A and 1B is also shown in a close-up view in FIG. 1C. Specifically, the close-up view shows that hook 104 includes four electrodes 140 (two resistor contacts 124 and two capacitor contacts 126). The four electrodes 140 are physically attached or embedded into the upper portion 144 of hook 104. In the example of FIG. 1C, each electrode is inserted into a respective channel within upper portion 144, which holds the electrodes in place while exposing the top portion of each electrode for electrical contact with the resistor and/or capacitor of smart hang tab 128. Also shown in FIG. 1C is the lower portion 142 of the hook 104. This lower portion 142 is physically connected to upper portion 144 by being inserted into a channel cut out of upper portion 144. Lower portion 142 acts as a structural support for upper portion 144.

Figure 2:
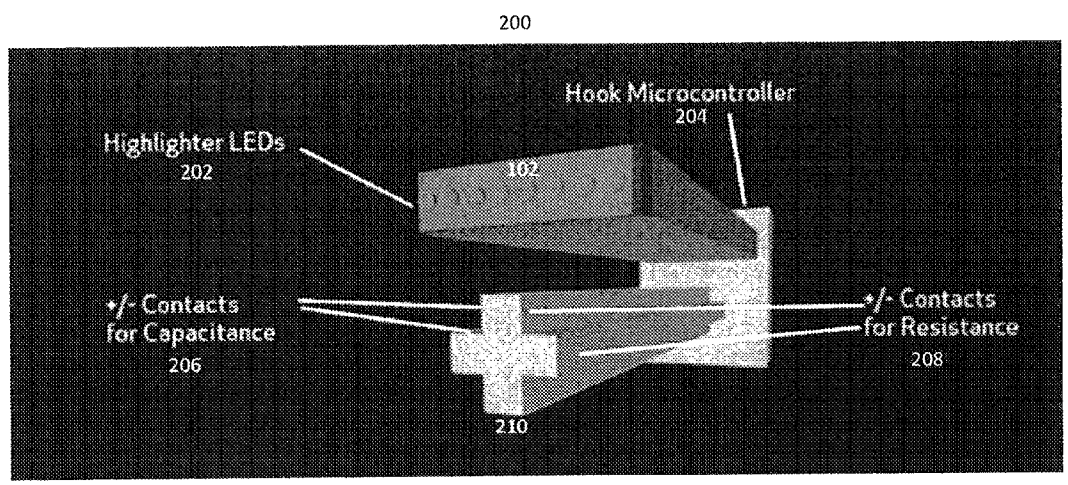
FIG. 2 shows a front view of an example of a smart hook having a cross shaped electrical contacts arrangement.

Smart hooks may be configured in many shapes. Another example of the smart hook 200 is shown in FIG. 2. The contacts and other electrical components may be implemented and connected in a manner similar to FIG. 1B. In this example, the microcontroller 204 (e.g. MCU 108 and associated electronics) may be mounted in the back of the mounting bracket (not shown but similar to 102 of FIG. 1A) for the hook 210 or within the display itself. In this example, the mounting bracket may have highlighter LEDs 202 (e.g. controlled by the processor 110 of MCU 108) mounted to the front for identifying specific hooks in the retail display. LEDs 202 on the mounting bracket are controlled by the processor 100 to light up to highlight a particular smart hook. This highlighting may be performed for various reasons. For example, the smart hook may be highlighted to indicate to a store employee that the smart hook needs to be restocked, or that incorrect items have been placed on the smart hook.

As contemplated, smart hooks may be configured in various shapes such as the cross shape 210 that is shown in FIG. 2. In this example, the cross shape allows for the capacitance contacts 206 to be spatially separated from the resistance contacts 208. Other shapes for configuring the smart hook are also possible (e.g. square, circle, triangle, etc.) as long as the contacts on the hook are sufficiently separated from each other (i.e. they are not touching each other).

When utilizing the configuration shown in FIG. 2, the hang tab in FIG. 3 may be mounted on each of the items that are hung on hook 104 creating a smart item. Specifically, the hang tab may include a cross shape opening 306 and an imbedded resistor 302 and capacitor 304. The cross-shaped opening 306 of the smart hang tab may be similar but sufficiently larger than the cross-shaped hook 210 in FIG. 2, so as to allow the smart hang tab to slide over the cross-shaped hook 210 thereby permitting the smart item to hang from the hook. This hang tab may be attached to each one of the products that are hung on hook 104. Thus, each smart item adds a resistance and a capacitance to hook 104 which is measured by the processor 110 of MCU 108 to determine a quantity and identity of the smart items hanging on hook 104 at any given time.

In the examples discussed so far, as each smart item is placed on the hook 210 using the hang tab shown in FIG. 3, the total equivalent resistance and capacitance that is measured by the processor 110 of MCU 108 on the contacts changes. The processor 110 of MCU 108 can measure the total equivalent resistance and capacitance on hook 210. This value may be recorded every time an smart item is placed on or taken off of the hook 210, for example, in response to a change of more than a threshold amount (up or down) in either one or both of the measured resistance and capacitance. As the equivalent total resistance and capacitance changes over time with more smart items being added on the hook, or removed from the hook 210, the processor 110 of MCU 108 can determine the quantity and identify of each of the smart items by comparing the total resistance and total capacitance before and after a smart item is taken from the hook or placed on the hook 210.

For example, each hang tab has a common resistance R, and a unique capacitance C1, C2, etc. for each unique smart item to be hung on the hook. The processor 110 of MCU 108 also knows the common resistances and the predetermined capacitances for each of the smart items in the store. Thus, when the first one of a particular smart item is placed on the hook, the processor 110 of MCU 108 measures a total resistance of R and a total capacitance of C1. The processor 110 of MCU 108 compares C1 to a threshold to determine the identity of the smart item. The processor 110 of MCU 108 also compares R to a threshold to determine the quantity on the hook. When a second one of the same smart item is placed on the hook, processor 110 of MCU 108 measures a total parallel resistance of (R1*R1)/(R1+R1) and a total parallel capacitance of C1+C1. The processor 110 of MCU 108 then determines that two of the same type of smart items are on the hook by comparing the total resistance and total capacitance to respective thresholds.

It should be noted that lookup tables may also be used to determine identification and quantity of items on the smart hook. For example, different levels of resistance and capacitance may be stored in a lookup table and associated with specific quantities and identities of items. In this scenario, the processor 110 may lookup the identity and quantity of the items in the lookup table based on the associated resistance and capacitance that are measured.

In this example, the processor 110 of MCU 108 knows that both smart items are the same because the total capacitance after the second smart item is placed on the hook is compared to the total capacitance prior to the second smart item being placed on the hook (e.g. if the total capacitance was C1 and then it becomes C1+C1, processor 110 of MCU 108 knows that both smart items have a same capacitance of C1).

If a smart item is then taken off of the hook, the total resistance increases from (R1*R1)/(R1+R1) to R1. In this example, the processor 110 of MCU 108 compares the resistance prior to the smart item being taken off the hook to the resistance after the smart item is taken off the hook. The processor 110 of MCU 108 then knows that one smart item has been taken off the hook due to this increased resistance. The processor 110 of MCU 108 also knows the identity of the smart item based on the decreased capacitance (e.g. by comparing the capacitance prior to the smart item being taken off the hook to the capacitance after the smart item is taken off the hook).

If an incorrect second smart item is placed on the hook (e.g. a smart item that is not the same type as the first smart item and has capacitance C2) after the first smart item with capacitance C1, the total capacitance is C1+C2. In this example, the processor 110 of MCU 108 again knows there are two smart items on the hook in view of the decrease in measured resistance from R1 to (R1*R1)/(R1+R1). In this example, however, the processor 110 of MCU 108 also knows that both smart items are different, because the total capacitance after the second smart item is placed on the hook is compared to the total capacitance prior to the second smart item being placed on the hook (e.g. if the total capacitance was C1 and then it becomes C1+C2, processor 110 of MCU 108 knows that the second smart item has a capacitance of C2). The processor may be able to determine the new capacitance C2 from the difference in previous and current measured capacitances and by comparing determined value C2 to capacitance values for different smart items, the processor may be able to identify the particular smart item incorrectly placed on the hook. This is one example of how the processor 110 of MCU 108 is able to identify smart items that are incorrectly placed on the hook. In this example, the processor 110 (either autonomously or in response to a request from the server) could control LEDs 102 or display tag 402 to indicate that incorrect items were placed on the smart hook. This allows the store employee to identify and rectify the problem.

Processor 110 of MCU 108 may periodically make capacitance and resistance measurements. Alternatively, processor 110 of MCU 108 may be triggered to take capacitance and resistance measurements whenever a product is placed on or taken from the smart hook. In either case, the processor 110 stores the resistance and capacitance values in memory 112 and compute the total equivalent resistance/capacitance of the smart hang tabs currently on the smart hook. This current value can be compared to previous values stored in memory 112 to determine how many items and what type of items have been added to or taken from the smart hook, regardless if a single product, or multiple products are taken from or added to the smart hook. For example, assume the processor 110 computes a difference between the current equivalent resistance and the previously measured equivalent resistance (e.g. RE−2R1−RE=2R1). The processor 110 knows that each product has a resistance of R1. Therefore, the processor 110 can determine that two products, having a combined resistance 2R1, have been removed from the smart hook.

Figure 4:
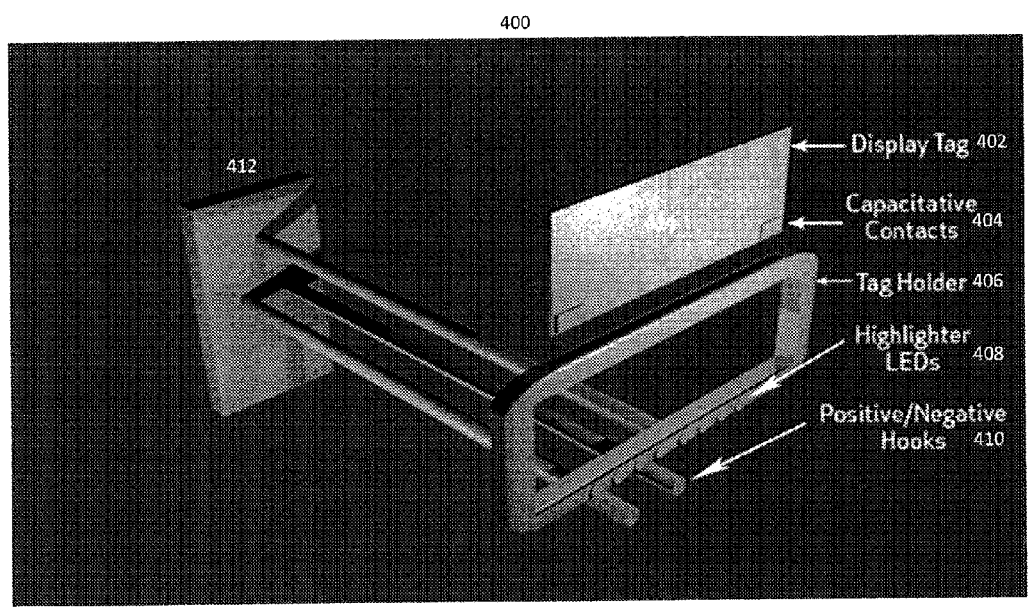
FIG. 4 shows a side view of an example of a smart hook with two parallel electrical contacts.

Yet another configuration of the hook is shown in FIG. 4 where only two positive and negative contacts 410 are implemented on mounting bracket 412. In this configuration, the smart hook also includes a tag holder 406, display highlighter LEDs 408, capacitance contacts 404 and a display tag 402. The display tag has capacitance contacts 404 which are able to identify a particular type of smart item that is displayed on the hook. In this example, the smart item may be identified by the display tag 402 which is read by the processor 110 of MCU 108. The smart hang tab in this situation may only have a resistance 502 and openings 504 and 506 that are shown in the smart hang tab of FIG. 5. Thus, the smart items that are placed on the hooks themselves allows the processor 110 of MCU 108 to determine their resistance, and therefore the quantity of the smart items placed on the hook. In conjunction, the capacitance added by display tag 402 identifies the smart items that are placed on the hook.

Figure 6A:
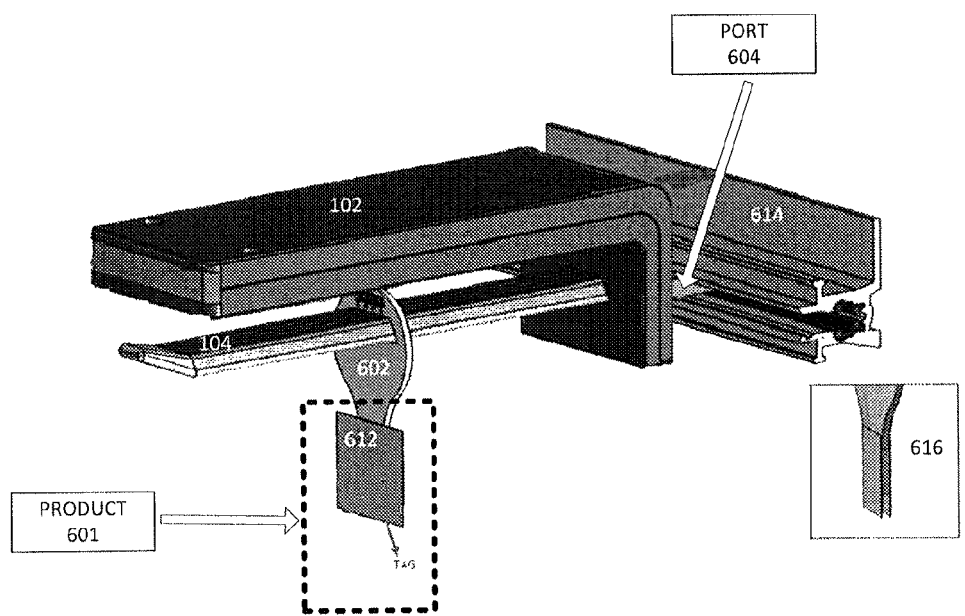
FIG. 6A shows a side view of the smart hook in FIG. 1A that includes a smart hang tab.

In another example shown in FIG. 6A each item (i.e. product) is hung from hook 104 via a smart hang tab 602 that includes a tag 612. This smart hang tab 602 includes a capacitor 632 and a resistor 636 mounted on a printed circuit board (PCB) (see FIG. 6C) which comes into electrical contact with the resistance/capacitance contacts on hook 104 via capacitor contacts 638 and resistor contacts 640 (see FIG. 6C). The capacitance value and resistance value of the capacitor/resistor are read by the processor 110 of MCU 108 through port 604. This capacitance value has an associated identity and the resistance value has an associated quantity. The processor 110 of MCU 108 can therefore determine the identity of the place holder tab based on the capacitance and the quantity of the products on the hook based on the resistance.

As shown in FIG. 6A, the mounting and display bracket 102 is physically connected to the store display (not shown) via mounting assembly 614. Mounting assembly 614 may include a channel having four electrical contacts (e.g. four wires) that electrically connect to the four respective electrical contacts embedded in hook 104. The wires in mounting assembly 614 carry the electrical signals to and from smart hook 100 and the backend processor circuit. The mounting and display bracket 102 may include port 604 extending from the rear of the assembly. This port 604 is inserted into the channel of mounting assembly 614, which makes the electrical connections between the electrical contacts of the hook 104 and the electrical contacts in assembly 614.

Also shown in FIG. 6A is a single side tag 612 that is physically connected to the smart hang tab 602. This single side tag 612 may be adhesive. The adhesive of the tag holds the weight of the product 601 hanging from hook 104. For more stability, the tag may also be implemented as a dual sided tag 616 which adheres to the product 601 on both sides of the tab.

Figure 6B:
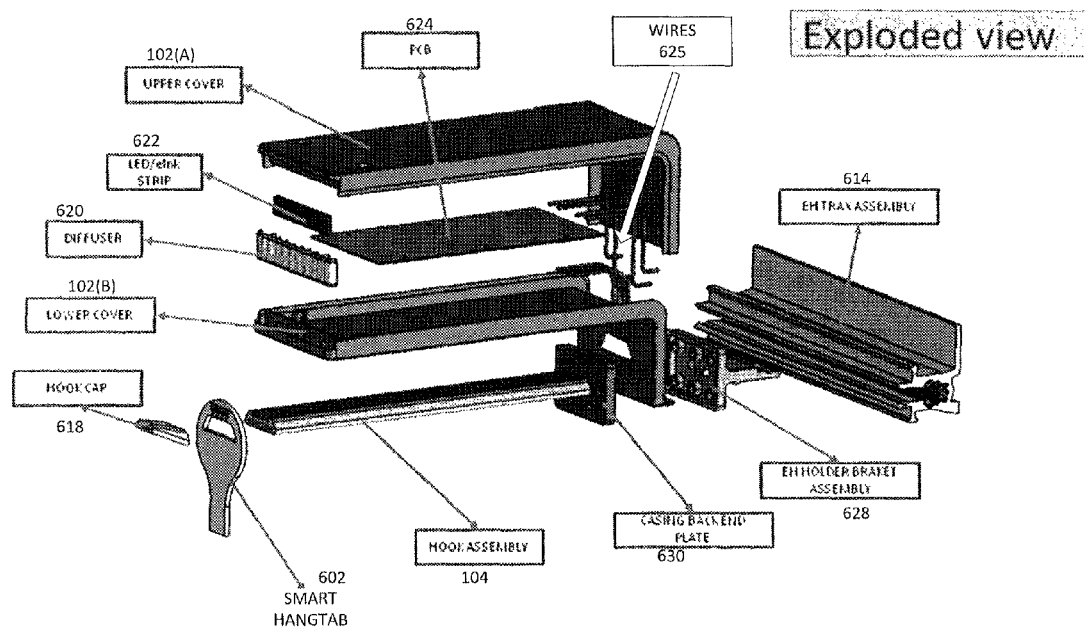
FIG. 6B shows an exploded view of the smart hook in FIG. 6A.
Figure 6C:
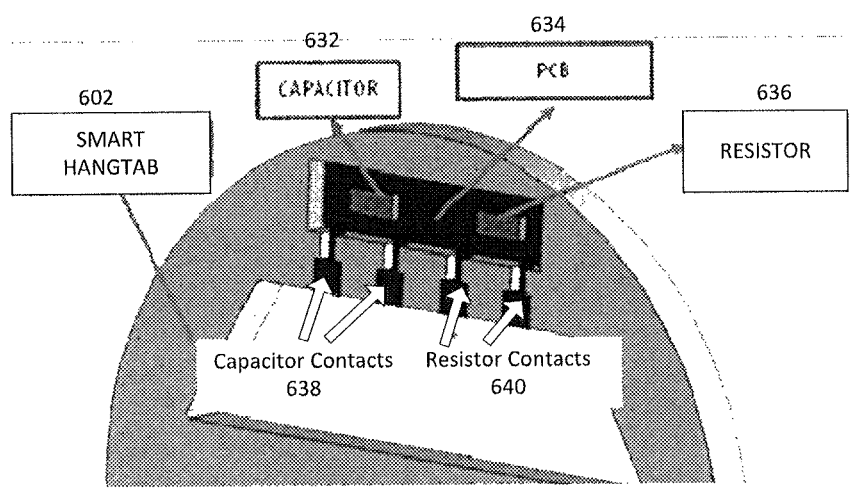
FIG. 6C shows a close up view of the smart hang tab in FIGS. 6A and 6B.

FIG. 6B shows an exploded view of the smart hook in FIG. 6A. Specifically, FIG. 6B shows the upper part 102(A) and the lower part 102(B) of display bracket 102. In between the upper part 102(A) and the lower part 102(B) of display bracket 102 is a PCB to which display LED/elink strip 622 is electrically connected. The display 622 is electrically connected to the PCB 624, which in turn is electrically connected via wires 625 that extend through holder bracket assembly 628 to be connected to wires in EH trax assembly 614. These wires allow data to be exchanged to and from display 622 and the controller (not shown) that monitors the smart hook assembly. For example, electrical signals that include product information and count may be sent from the controller to the PCB and then to display 622. The display 622 may also be automatically updated to display updated product identification and count as products are hung on the hook or taken off of the hook. It is also note that display 622 may include a light diffuser 620 for diffusing light emitted by the LEDs in the display 622.

Also shown in FIG. 6B are hook cap 618 that is mounted to the end of hook assembly 104 to provide a suitable end for placing the place holder 602 and/or the smart hang tab. Also included is a casing backend plate physically connected to the hook assembly 104 for mounting the hook assembly 104 to the display bracket 102. On the back of the display bracket 102 there is also a holder bracket assembly 628 that is physically connected to the display bracket 102 for attaching the hook assembly 104 to the EH trax assembly 614 (i.e. a portion of 628 mounts to the display bracket 102 while another portion of 628 is inserted into EH trax assembly 614). It is noted that holder bracket assembly 628 also includes the electrical contacts to implement port 604 for electrically coupling the hook assembly 104 to the EH trax assembly 614, and ultimately to the controller for monitoring the items on the hook.

Figure 6D:
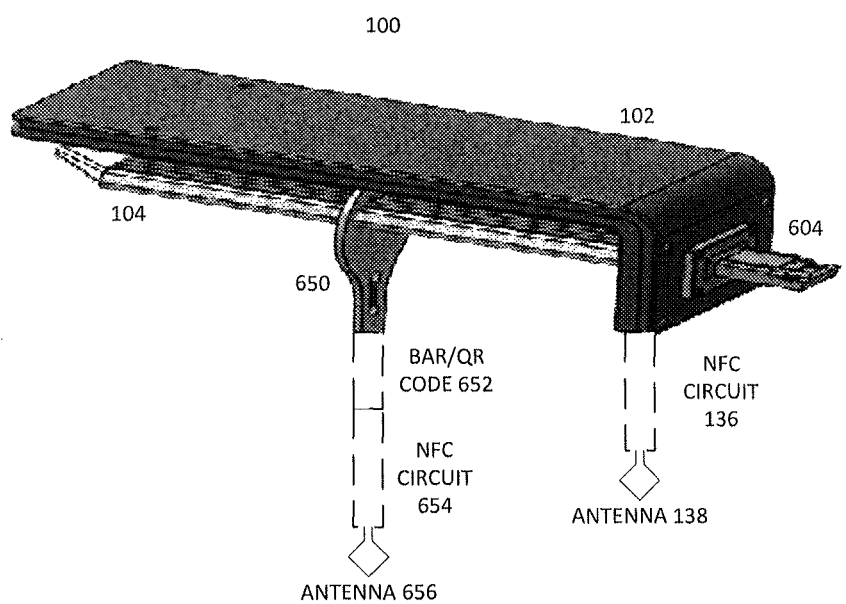
FIG. 6D shows another side view of the smart hook in FIG. 1A that includes a place holder tab.

In yet another example shown in FIG. 6D, rather than each smart item having its own smart hang tab, the system includes a place holder tab 650 is placed on the hook 104 prior to putting any smart items or conventional products on the hook. This place holder tab may be similar in structure to the smart hang tab. In one example, the place holder may include a capacitor which comes into electrical contact with the contacts on hook 104. This capacitance value is read by the processor 110 of MCU 108 through output port 604. This capacitance value has an associated identity. The processor 110 of MCU 108 can therefore determine the identity of the place holder tab based on the capacitance. The processor 110 of MCU 108 then associates any smart items or conventional products with or without smart hang tabs that are subsequently placed on the hook with the identity of the place holder tab 602. For example, the place holder tab can be used with smart items having only resistors in the smart hang tab to indicate quantity, and with conventional products that do not have a smart hang tab at all.

Alternatively, the place holder tab 650 may not have any capacitance or any electrical contacts. The place holder tab 650 shown in FIG. 6D may identify the smart items/products on the hook by other identification means. For example, the place holder tab 650 shown in FIG. 6D may include a near field communication (NFC) circuit 654 (i.e. transceiver) and NFC antenna 656 which transmits a digital identity code to the NFC circuit 136 via antenna 138 (mounted to the back portion of the hook). The processor 110 of MCU 108 may then read this information from the NFC circuit to decode the identity of the products associated with the place holder tab. The NFC solution may include a NFC scanner on the base of each smart hook (e.g. processor 110 of MCU 10 is connected to multiple NFC circuits) which reads an identity value of each place holder tab that is placed on the hook. This value is then communicated to the processor 110 of MCU 108 to identify the location of each of the products on the display. This identification can be performed by the processor 110 of the MCU 108, because each smart hook has an NFC circuit that has a known associated location in the store (e.g. aisle 10, shelf 4, section 2). This known location may be automatically or manually programmed into the server when the smart hook is installed. For example, the store employee, upon installing the smart hook may manually program the location of the smart hook by indicating aisle number, shelf number, etc. Alternatively, the hook control circuit may determine which aisle, shelf, etc., that the smart hook is located. This information is then passed to the server. It is noted that other wireless RF communications such as WiFi, Bluetooth, etc., may be used in place of the NFC transceiver.

In another example (not shown), the hook 104 may not include electrical contacts for measuring resistance. The hook 104 may include a pressure sensitive conductive material such as Velostat/Linqstat along the length of the hook (the material coats the hook). Every time a smart item or a conventional product (without the smart tab) has been placed on the hook the pressure of the smart item/product changes the resistance of the conductive material. This change in resistance may then be measured and utilized by processor 110 of MCU 108 to count the number of items placed on hook 104.

In either the electrical contact example or pressure sensitive conductive material example the overall resistance of the smart items/products placed on the hook is measured in order to determine the quantity of smart items/products. The identity of the smart items/products on the hook are determined based on the capacitance of the hang tab itself (assuming a smart item) or based on the capacitance of the place holder tag that is placed on the hook. In general, the place holder tag can be used with smart items and with conventional products that do not have any resistive or capacitive values.

In yet another example, a rear projection scanner may also be implemented. In order to utilize a rear projection scanner, the smart hook may expose a barcode or QR code (see bar/QR code 652 in FIG. 6D) of the place holder tab 650 to the rear projection scanner (see scanner 826 in FIG. 8) which identifies the smart items/products on each hook. The rear projection scanner may be mounted behind the display and may be able to perform a periodic or user initiated scan to read the digital codes displayed on the smart hooks.

In one example, each of the smart hooks may have their own dedicated rear projection scanner mounted directly behind the smart hook. In another example, the rear projection scanner may be movable within the display. The scanner is controlled to move to each different smart hook and read the various barcodes.

Figure 7:
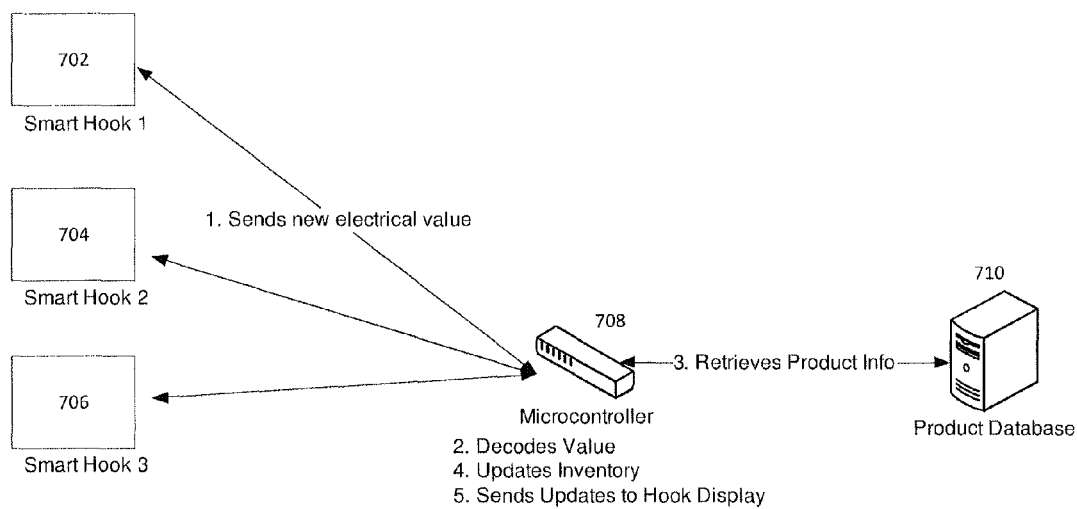
FIG. 7 is a block diagram illustrating communication between multiple smart hooks, a micro-controller and an inventory database.

In general, each smart hook on the retail display is connected to a microcontroller (e.g. the processor 110 of MCU 108) that is able to decode the electrical values (e.g. capacitive and resistive), retrieve product information from a database, update inventory and send updates to the hook display. Specifically, as shown in FIG. 7, three smart hooks 702, 704 and 706 on a display are shown. The microcontroller 708 measures the resistance and/or capacitance value from each of the smart hooks. The microcontroller receives identity information from the NFC place holder tabs and the rear projection scanner (assuming they are utilized).

In either case, the microcontroller determines a quantity of the smart items/products on each of the smart hooks based on the resistance of values that are measured from the smart hang tab or the place holder tab. The microcontroller also identifies of each of the smart items/products placed on the smart hook based on the capacitance value measured from the smart hang tab or the place holder tab, or based on the identity information received from the NFC place holder tab or the rear projection scanner. The microcontroller 708 then retrieves product information from the product database 710. Product database 710 may be a server that is located within the store or at a remote location which keeps track of the inventory. The microcontroller is then able to update the product inventory information and send this update to the product database 710.

It should also be noted that the microcontroller can send an update and instructions to the smart hook display on each of the smart hooks. For example, microcontroller instructs the smart hook display to flash light emitting diode (LED)s or change the description of the smart item, quantity of the smart item, price of the smart item, etc. This can be accomplished since the smart hook display may be configured with a programmable electronic display, such as a LED display and/or a liquid crystal display (LCD).

It should be noted that microcontroller 708 may be housed within the retail display and connected to each of the smart hooks by either a wired or a wireless connection. In the case of a wireless connection, each smart hook includes a transceiver to transmit the various measured values to the microcontroller and receive commands from the microcontroller. The microcontroller may be located somewhere within the store and connected to the product database 710.

Figure 8:
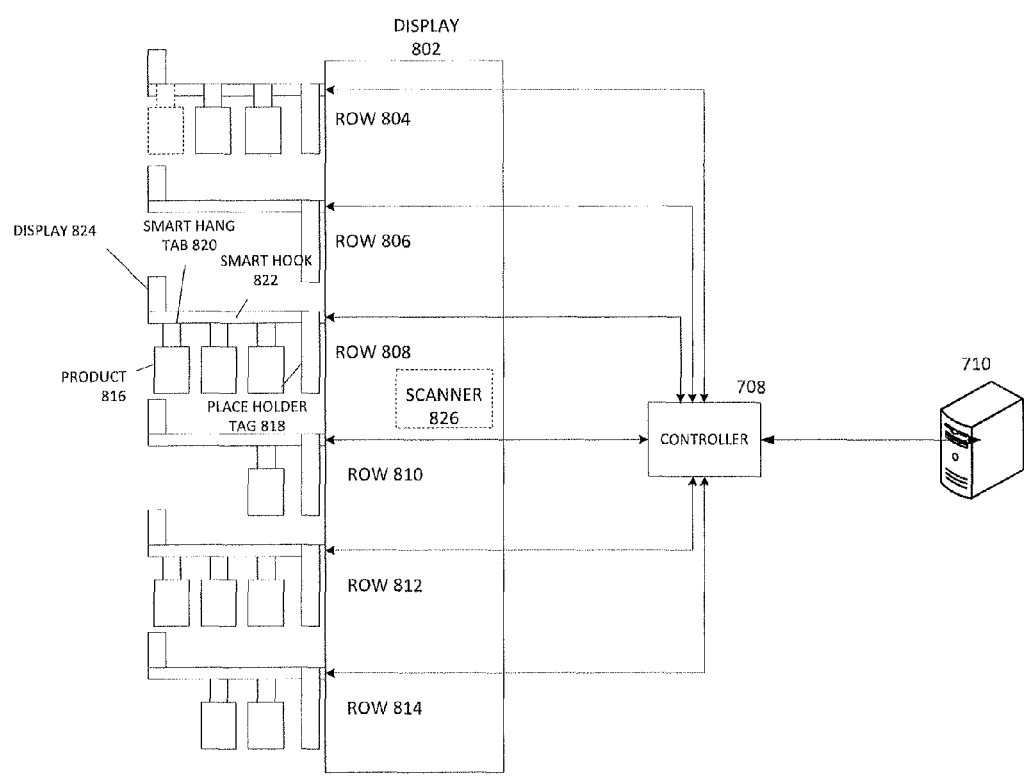
FIG. 8 shows a side view of an example of a store display having multiple smart hooks communicating with a controller and an inventory database.

For example, the smart hooks, controller and product database may be configured as the system shown in FIG. 8. The retail display 802 may include six rows (804, 806, 808, 810, 812 and 814) of smart hooks having smart items hung thereon. Each smart hook 822 may include various smart items 816 along with smart hang tab 820, place holder tab 818 and display 824. Depending on the type of smart hook 822, a rear projection scanner 826, that is either static or movable throughout the display 802, may also be optionally included. In general, each of the smart hooks 804-814 is connected to a controller 708 which is located somewhere within the store. Controller 708 is also connected to the product database 710.

In the example shown in FIG. 8, each product 816 has a smart hang tab 820, thereby creating a smart item, which electrically connects to the smart hook 822. The smart hang tab 820 may include a resistance value which electrically connects to the contacts on the smart hook 822. It should be noted that in other scenarios, the smart hang tabs may not have resistance values. For example, the smart hook 822 may be configured with a pressure sensitive conductive material. In this example, the conventional (dumb) items (i.e. products) can just simply be placed on the hook. The pressure these products exert on the hook 822 changes the resistance of the hook which is measured by controller 708. In either case, the controller 708 measures the resistance on smart hook 822 and determines the quantity of products that are hanging on smart hook 822.

In the example shown in FIG. 8, the smart hook 822 also includes a place holder tab 818. The place holder tab 818 may include a capacitive electrical contact that comes into contact with the electrical contacts on smart hook 822. The controller 708 then measures the capacitance value of place holder tab 818. In another example, the place holder tab 818 may be a NFC transmitter that transmits an identity (i.e., a new digital code) to controller 708 to identify the smart items/products that are hung on smart hook 822. In yet another example, the place holder tab 818 may include a barcode or a QR code that is scanned by rear projection scanner 826. Rear projection scanner 826 then sends this identity information to controller 708 where the products hanging on smart hook 822 may be identified. In either case place holder tab 818 provides information sufficient to identity smart items/products that are hung on smart hook 822.

It should also be noted that in another example, the place holder tab 818 may not be necessary. Specifically, the smart hang tab 820 on each of the smart items may also include the capacitance value (i.e., each smart item places both a resistance and a capacitance value on the hook to help the controller 708 identify the quantity and identity of the smart items).

In addition, the smart hook 822 may also include a smart display 826 which may be a LED display or an LCD that is controllable by controller 708. During operation, controller 708 may control the display to control displayed information such as issuing alerts to store employees or to customers using flashing lights, changing the identity of the smart item, changing price of the smart item, and changing quantity of the smart items that are currently hung on the various smart hooks.

An example of the operation of the smart hooks will now be described. In this example, it is assumed that each product is fitted with a smart hang tab. Each smart hang tab 820 includes a resistance to identify the quantity of the smart items hanging on the hook. It is also assumed that each hook has a place holder tab 818 which includes a capacitance value to identify the type of smart items being placed on the hook.

In this example, controller 708, by measuring both the resistance and capacitance values from smart hooks 804-814, determines that smart hook 804 includes three smart items, smart hook 806 does not have any smart items, smart hook 808 includes three smart items, smart hook 810 includes one smart item, smart hook 812 includes three smart items and smart hook 814 includes two smart items. The quantity and identity of the smart items are determined based on the resistance in the smart hang tabs 820 and the capacitance of the place holder tab 818 for each of the smart hooks 804-814. This allows controller 708 to update these values in the product database 710.

Controller 708 can also determine that the smart hooks 806 and 810 need to be restocked due to lack of inventory. If the inventory is currently stored within the store, controller 708 can send out an alert signal to a desktop computer, or a mobile device of an employee of the store to let them know that products on smart hooks 806 and 810 need to be restocked. Controller 708 may, in conjunction or alternatively, send alerts signals to displays 824 of both smart hooks 806 and 810. The displays of the smart hooks may transmit a flashing LED light, or some other alert signal that lets the store employees know that each of these hooks needs to be restocked. Once the store employee restocks the hooks, the controller 708 measures (e.g. using resistance values) that each of the hooks is restocked and sends this information to the product database 710, thereby updating inventory. This process allows controller 708 to keep track of the inventory out in the retail display and in the storage room of the store.

In another example, when the smart hang tab 820 also include the capacitance value for identity purposes, the controller 708 can also determine that the first smart item hanging on smart hook 804 has been misplaced. The controller 708 may determine that the capacitance value does not correspond to the smart items that are currently hanging on smart hook 804. The controller may determine that this smart item should be placed on a lower smart hook (e.g., smart hook 814). The controller 708 may then send a signal to the display of smart hook 804, thereby flashing a light or displaying a message on the display, telling the store employee to remove the misplaced smart item on hook 804, and place it on bottom smart hook 814. This helps store employees not only keep track of inventory, but also keep track of misplaced smart items that typically occur when customers take an smart item off a smart hook and place it on an incorrect smart hook. The alert may also be utilized to alert the consumer that they have placed the smart item on the incorrect smart hook.

Figure 9:
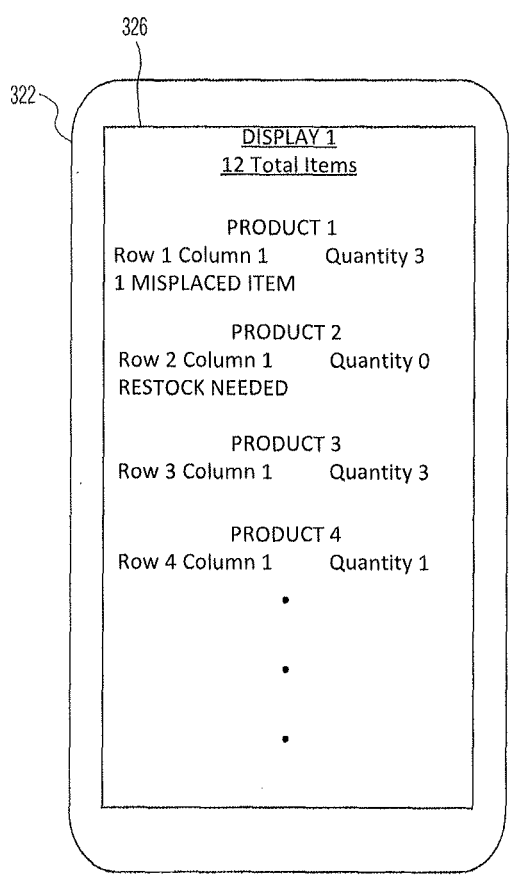
FIG. 9 shows an example of an inventory display on a mobile device.

As described with respect to FIG. 8, the store employee may have a mobile device that receives inventory information from the controller. An example of such a display is shown on the Smartphone of FIG. 9 where a particular display is identified to include twelve total smart items. The display lets the store employee know that one misplaced smart item is on the first column (e.g. hook 804 of FIG. 8). The display also lets the store employee that the second row (e.g. hook 806 of FIG. 8) does not have any smart items, and needs to be restocked. Likewise, the inventory in each of the other rows is identified on the displayed to let the store employee know the quantity of smart items currently on each of the hooks. In general, this inventory information can be displayed on the mobile device, desktop computer, laptop computer or any other computer based device so that the employee can properly view and track the inventory.

Figure 10:
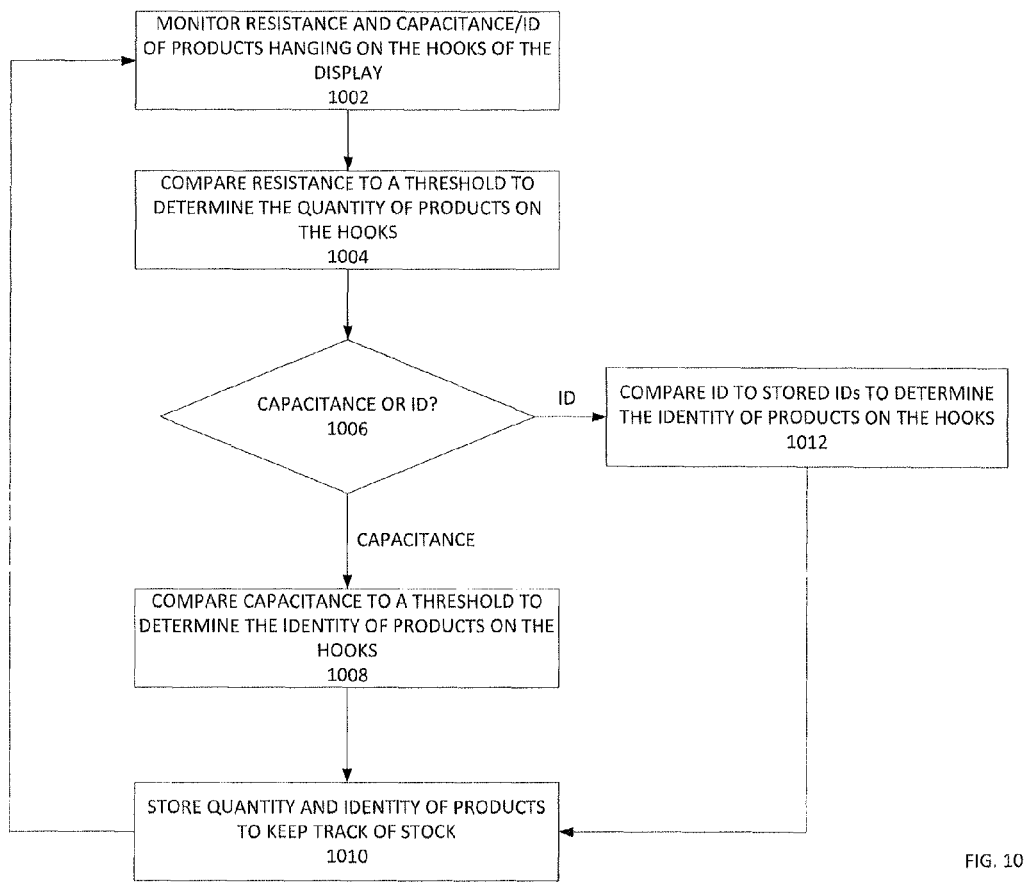
FIG. 10 shows a flowchart of an example of operation of the smart hook, controller and server.

Shown in FIG. 10 is a flowchart with the general overall description of the operation of the smart hook system shown in FIG. 8. In step 1002 the controller (e.g. the processor 110 of MCU 108) monitors resistance and the capacitance (or ID) of the products hanging on the hooks of the display. The microcontroller then compares the resistance to a threshold value to determine the quantity of the products on the hook in step 1004. In step 1006 the microcontroller determines whether there is a capacitance to be measured or an ID to be received from the smart hook. If there is a capacitance to be measured, the controller compares the capacitance to a threshold to determine the identity of the products on the hooks in step 1008. In step 1010 the controller then stores the identity and quantity of the products to keep track of the stock. If the ID is utilized, rather than the capacitance, the controller receives the ID from the NFC transceiver or from the rear projection scanner. The controller compares the ID to stored IDs in a database to determine the identity of the products on the hooks in step 1012. Likewise, in step 1010 the controller then stores the quantity and identity of the products to keep track of the stock. This process is continuously or periodically performed by the controller.

Figure 11:
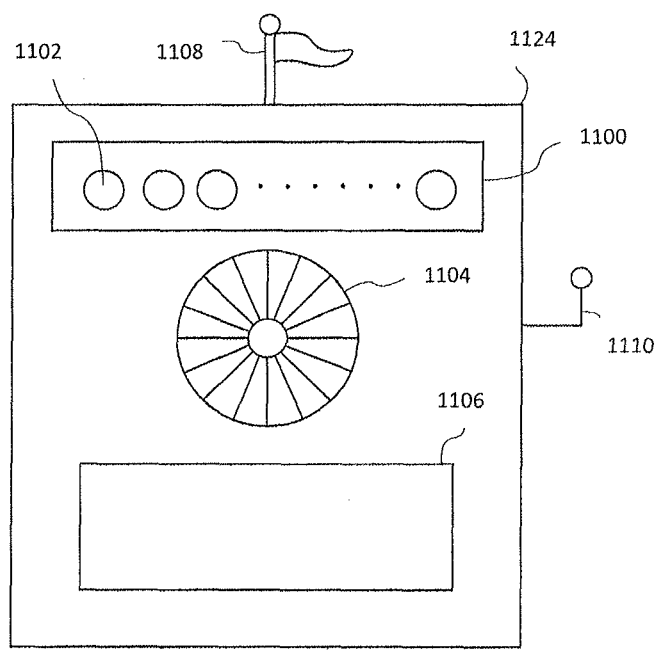
FIG. 11 shows an external view of the smart hook displays in FIG. 8.

FIG. 11 shows a smart hook display 1124. Smart hook 1124 may be an electronic unit that includes a processor and a transceiver. Highlighter 1124 may include devices to display information on smart items on the smart hook. An example of such devices may include a light array 1100 (that includes LEDs 1102 or LCDs) to show smart item quantity, smart item identity, and smart item price to the customer. The display device 1124 may also include a speaker 1104 for emitting a sound, a scent box 1106 that may include a fan (not shown) that is able to blow air through or across the scent box thereby emitting a scent (e.g. scent associated with the smart item) in the vicinity of the smart item. In yet another example, the display device 1124 may include other types of indicators such as physical flags 1108 that can pop up or down depending on the control of the microcontroller. Device 1124 may also have an antenna 1110 that is communicating to the microcontroller and to the mobile device held by the store employees.

Figure 12:
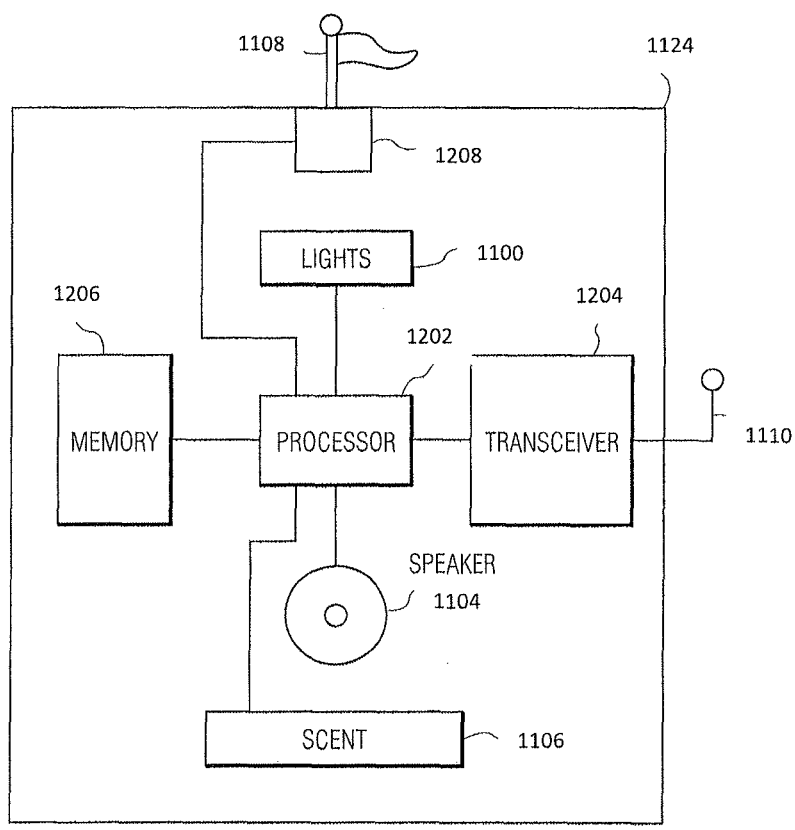
FIG. 12 shows an internal block diagram of the smart hook display in FIG. 11.

FIG. 12 shows internal components of the display device 1124 in FIG. 11. Device 1124 may include a processor 1202 for controlling the display device, memory 1206 for storing data, transceiver 1204 for allowing communication between device 1124 and other external devices via antenna 1110, and an actuator 1208 for causing flag 1108 to be extended and retracted.

Figure 13:
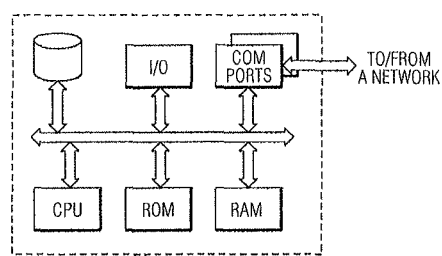
FIG. 13 shows a simplified functional block diagram of a computer that may be configured as the controller or product server in FIG. 8.
Figure 14:
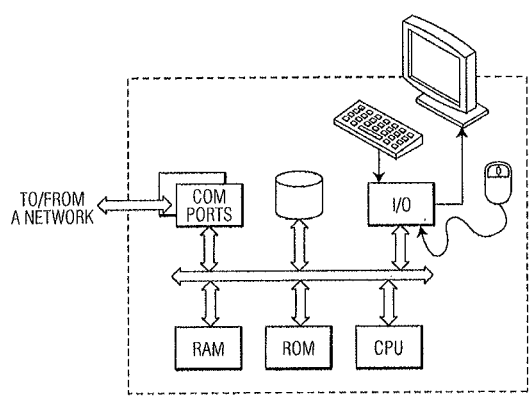
FIG. 14 is a simplified functional block diagram of a personal computer or other work station or terminal device used to monitor inventory.

FIGS. 13 and 14 provide functional block diagram illustrations of general purpose computer hardware platforms. FIG. 13 illustrates a network or host computer platform, as may typically be used to implement the micro-controller or server shown in the figures. FIG. 14 depicts a computer with user interface elements, as may be used to implement a personal computer or other type of work station or terminal device for keep track of inventory, although the computer of FIG. 14 may also act as a server if appropriately programmed. It is believed that the general structure and general operation of such equipment as shown in FIGS. 13 and 14 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 14). A mobile device type user terminal may include similar elements, but typically uses smaller components that also require less power, to facilitate implementation in a portable form factor. The various types of user terminal devices also include various user input and output elements. A computer, for example, may include a keyboard and a cursor control/selection device such as a mouse, trackball, joystick or touchpad; and a display for visual outputs. A microphone and speaker enable audio input and output. Some smartphones (e.g. like 322 in FIG. 3) include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, aspects of the methods of providing inventory tracking may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the service provider into the controller and/or product server of in store processing system. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the mobile devices, controller, server, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed:

1. A system comprising:
a hook shaped to receive and retain a plurality of hang tabs to be attached to a plurality of items for display, each of the plurality of hang tabs including a resistor and a capacitor, and
the hook including a plurality of electrical contacts to electrically contact the plurality of hang tabs retained by the hook,
the plurality of electrical contacts including:
at least two resistive electrical contacts to electrically contact the resistor of each of the plurality of hang tabs retained by the hook, and
at least two capacitive electrical contacts to electrically contact the capacitor of each of the plurality of hang tabs retained by the hook,
the at least two resistive electrical contacts and the at least two capacitive electrical contacts being configured in a cross pattern; and
a processor connected to the at least two resistive electrical contacts and to the at least two capacitive electrical contacts,
the processor being to:
receive, from the at least two resistive electrical contacts, indications of resistances based on the at least two resistive electrical contacts electrically contacting the resistor of each of the plurality of hang tabs;
receive, from the at least two capacitive electrical contacts, indications of capacitances based on the at least two capacitive electrical contacts electrically contacting the capacitor of each of the plurality of hang tabs;
determine a quantity of the plurality of items based on one of the indications of the resistances or the indications of the capacitances; and
determine identities of the plurality of items based on another of the indications of the resistances or the indications of the capacitances.

2. The system of claim 1, where the hook includes a cross-shaped cross-section.

3. The system of claim 1, further comprising:
a display to display information indicating the quantity of the plurality of items and the identities of the plurality of items,
the display being electrically coupled to the processor; and
where the processor is further to:
provide, to a server device, the information indicating the quantity of the plurality of items and the identities of the plurality of items.

4. The system of claim 1, where the processor is further to:
receive a stock request from a server device; and
provide, to the server device and based on the stock request, information indicating the quantity of the plurality of items and the identities of the plurality of items.

5. The system of claim 1, where:
a cross-section of the hook is cross-shaped, and
each of the plurality of hang tabs includes a cross-shaped opening that is larger than the cross-shaped cross-section of the hook.

6. The system of claim 1, where the at least two resistive electrical contacts are arranged orthogonally to the at least two capacitive electrical contacts.

7. The system of claim 1, where the processor is further to:
provide, via a display associated with the system, information indicating the quantity of the plurality of items and the identities of the plurality of items.

8. A system comprising:
a hook shaped to receive and retain a plurality of hang tabs to be attached to a plurality of items for display, each of the plurality of hang tabs including a resistor and a capacitor; and
a plurality of electrical contacts to electrically contact the plurality of hang tabs retained by the hook,
the plurality of electrical contacts being included in the hook, and
the plurality of electrical contacts including:
at least two resistive electrical contacts to electrically contact the resistor of each of the plurality of hang tabs retained by the hook, and
at least two capacitive electrical contacts to electrically contact the capacitor of each of the plurality of hang tabs retained by the hook,
the at least two resistive electrical contacts and the at least two capacitive electrical contacts being configured in a cross pattern,
the at least two resistive electrical contacts providing, to a device, indications of resistances based on the at least two resistive electrical contacts electrically contacting the resistor of each of the plurality of hang tabs, and
the at least two capacitive electrical contacts providing, to the device, indications of capacitances based on the at least two capacitive electrical contacts electrically contacting the capacitor of each of the plurality of hang tabs.

9. The system of claim 8, where the device is to:
receive the indications of the resistances and the indications of the capacitances;
determine a quantity of the plurality of items based on one of the indications of the resistances or the indications of the capacitances; and
determine identities of the plurality of items based on another of the indications of the resistances or the indications of the capacitances.

10. The system of claim 9, further comprising:
a display to:
  receive, from the device, information indicating the quantity of the plurality of items and the identities of the plurality of items; and
  display the information indicating the quantity of the plurality of items and the identities of the plurality of items.

11. The system of claim 8, where the hook includes a cross-shaped cross-section.

12. The system of claim 8, where:
a cross-section of the hook is cross-shaped, and
each of the plurality of hang tabs includes a cross-shaped opening that is larger than the cross-shaped cross-section of the hook.

13. The system of claim 8, where the at least two resistive electrical contacts are arranged orthogonally to the at least two capacitive electrical contacts.

14. The system of claim 8, where each of the at least two capacitive electrical contacts are spatially separated.

15. A smart hook comprising:
a hook shaped to receive and retain a plurality of hang tabs to be attached to a plurality of items for display, each of the plurality of hang tabs including a resistor and a capacitor, and
the hook including a plurality of electrical contacts to electrically contact the plurality of hang tabs retained by the hook,
  the plurality of electrical contacts including:
    at least two resistive electrical contacts to electrically contact the resistor of each of the plurality of hang tabs retained by the hook, and
    at least two capacitive electrical contacts to electrically contact the capacitor of each of the plurality of hang tabs retained by the hook,
    the at least two resistive electrical contacts and the at least two capacitive electrical contacts being configured in a cross pattern,
    the at least two resistive electrical contacts providing, to a device, indications of resistances based on the at least two resistive electrical contacts electrically contacting the resistor of each of the plurality of hang tabs, and
    the at least two capacitive electrical contacts providing, to the device, indications of capacitances based on the at least two capacitive electrical contacts electrically contacting the capacitor of each of the plurality of hang tabs.

16. The smart hook of claim 15, where the device is to:
receive the indications of the resistances and the indications of the capacitances;
determine a quantity of the plurality of items based on one of the indications of the resistances or the indications of the capacitances; and
determine identities of the plurality of items based on another of the indications of the resistances or the indications of the capacitances.

17. The smart hook of claim 16, further comprising:
a display to:
  receive, from the device, information indicating the quantity of the plurality of items and the identities of the plurality of items; and
  display the information indicating the quantity of the plurality of items and the identities of the plurality of items.

18. The smart hook of claim 15, where:
a cross-section of the hook is cross-shaped, and
each of the plurality of hang tabs includes a cross-shaped opening that is larger than the cross-shaped cross-section of the hook.

19. The smart hook of claim 15, where the at least two resistive electrical contacts are arranged orthogonally to the at least two capacitive electrical contacts.

20. The smart hook of claim 15, where each of the at least two capacitive electrical contacts are spatially separated.

* * * * *